INVENTOR
Philip Spergel

United States Patent Office 3,045,222
Patented July 17, 1962

3,045,222
TRANSPORTATION LAG COMPENSATOR
Philip Spergel, Saxonville, Mass., assignor to Industrial Nucleonics Corporation, a corporation of Ohio
Filed Nov. 3, 1958, Ser. No. 771,272
8 Claims. (Cl. 340—213)

This invention relates to a control system for an industrial process, and more specifically to a new and improved means of compensating a continuous control system for a varying transportation lag in sensing control signals.

Industrial processes such as steel rolling, rubber calendering, paper manufacturing, etc., are difficult to control due to the inherent variability of transportation lag in the system. The lag varies as a function of process speed and must be measured so that suitable compensation may be provided therefor in the control system. Most electronic controllers give a type of correction action proportional to a voltage that is received and the controller gain is adjusted so that the controller action is proper. One method makes use of an on time and an off time cycle to compensate for transportation lag. As the transportation lag increases in time, the off time of the controller is increased. The off time is controlled by a pulse timer geared to the process. This method does not permit the continuous control of a process, and therefore, does not permit the smooth control desired in many applications. Therefore, a control technique which provides a smooth, continuous control to compensate for transportation lag is highly desirable in processes of the above mentioned industrial fields.

According to this invention, the transportation lag is compensated in a manner whereby the error control voltage sensitivity is varied according to the speed of the process. This varying error voltage sensitivity provides the controller with a signal proportional to the speed of the process and results in a smooth, continuous control operation.

It is an object of this invention to provide a new and improved control system for regulating industrial processes of the type described hereinabove.

A further object of this invention is to provide a control system which permits smooth and continuous control of processes with varying transport lag.

A still further object of this invention is to provide a control system wherein a transportation lag compensator provides a controlling signal which is proportional to process speed.

Another object of this invention is to provide a transportation lag compensator which may be readily adapted for installation on existing commercial processing machines.

Still another object is to provide a control apparatus which can be made available at relatively low cost and which requires a minimum of adjustment and maintenance.

Figure 1:
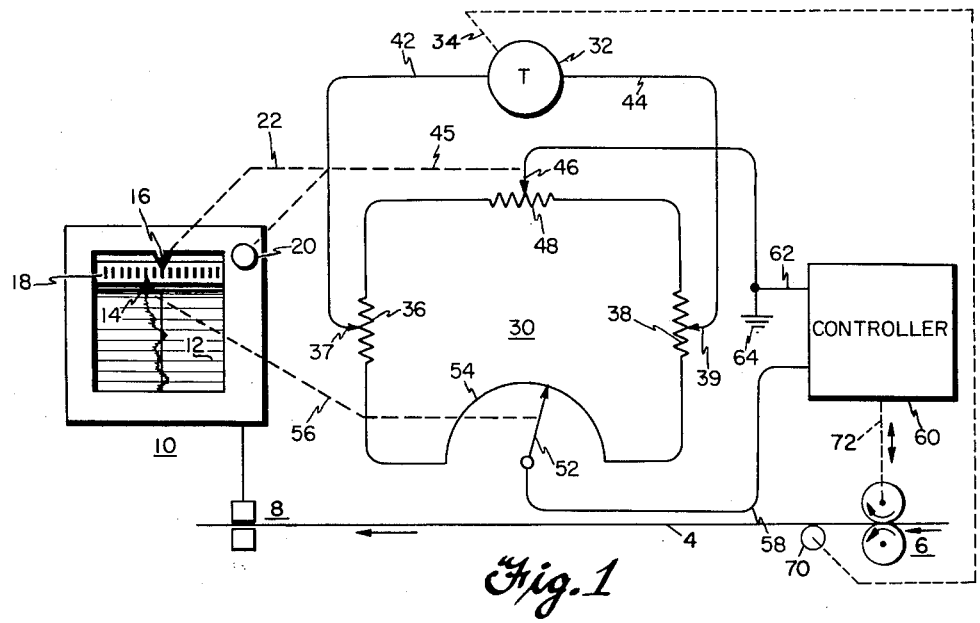
Figure 2:
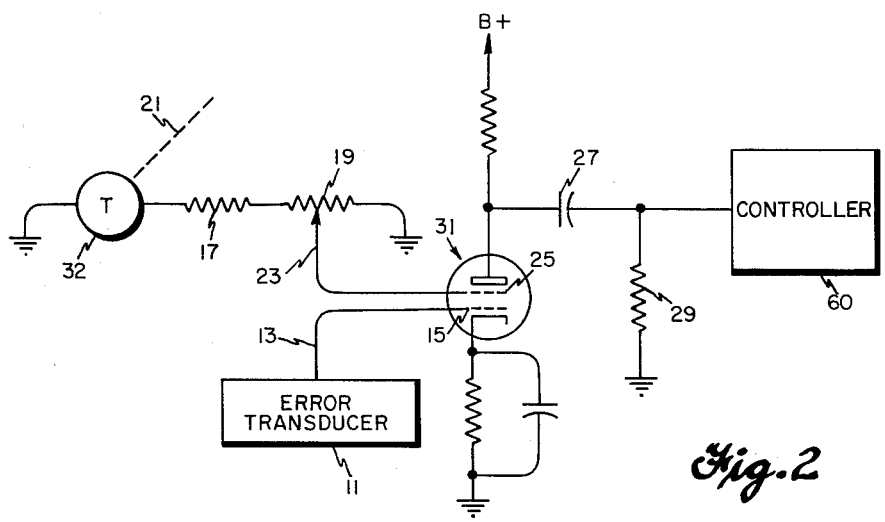

Other objects and advantages will be apparent from the following description taken in conjunction with the appended drawings: FIG. 1 shows a compensating device using a balanced electrical bridge;

FIG. 2 shows the use of a varying gain electronic amplifier in the compensating device.

Referring to FIG. 1, there is shown for illustrative purposes a traveling material sheet 4 undergoing reduction between the rolls of a calender 6. The sheet 4 exiting from the calender subsequently passes through a gauging head 8 which is connected to a sheet thickness recorder 10. The gauging system 8 and 10 is preferably of the type which is disclosed in Patent No. 2,829,268. While the invention is herein illustrated in a controller for maintaining constant the thickness of the sheet 4, it will be understood that it is applicable to a great variety of processes wherein a material characteristic is automatically controlled by the output of a measuring device responsive to said characteristic. The invention has unique advantages where the process is subject to speed variations, because speed variations result in a variable transportation lag. In the showing of FIG. 1, the transportation lag is, in substance, the time required for an incremental length of the sheet 4 to travel from the calender 6 to the location of the gauging head 8. The recorder 10 has a chart 12 which moves under an indicating and recording pointer 14 which is driven by a recorder indicator mechanism, not shown. A manually adjustable target indicator 16 is movable across the face of the calibrated recorder scale 18 by the target adjust knob 20 through a mechanical coupling 22.

Also shown is an electrical bridge network 30 connected with a tachometer generator 32. The generator 32 is coupled to the process speed through a mechanical coupling 34 with a speed transmission member such as, for example, a roll 70 in tractive engagement with the traveling sheet 4, thus supplying a varying D.C. voltage to the bridge 30 through lines 42, 44 to the target centering potentiometers 36 and 38. The variable contact 46 of the target potentiometer 48 is coupled to target adjust knob 20 through a mechanical linkage 45 so that a manual adjustment of target indicator 16 will also adjust contact 46 proportionally. The remaining leg of bridge 30 comprises a slidewire resistance 54 in which the movable contact 52 is coupled through linkage 56 to the recorder indicator mechanism. The recorder indicator mechanism drives pointer 14 so that movement of pointer 14 is accomplished by a proportional movement of contact 52. The circuit of bridge 30 is completed through line 58, controller 60, line 62, and ground 64. The controller 60 may be of the type shown and described in the patent application of S. Radley and P. Spergel Serial No. 641,414, now Patent No. 2,955,206. The controller provides a mechanical output as indicated by the dotted line 72 which is adapted to continuously vary the spacing between the rolls of the calender 6, thereby to maintain a constant, desired thickness of the sheet 4. As is more fully explained in Patent No. 2,955,206 cited, the time rate of correction to the calender roll spacing adjustment, for a given amount of error in the measured thickness of the strip, is referred to as the "gain" of the control system. By providing a variable error voltage sensitivity dependent on the speed of the process, the present invention is adapted to vary the gain of the control system in inverse proportion to the variable transportation lag of a variable speed process.

The target indicator 16 of the gauge recorder 10 is set to the desired position by knob 20 which adjusts slider 46 of rheostat 48. Sliders 37 and 39 of target centering potentiometers 36 and 38 are "tracking" adjustments which are initially used to balance out the residual resistances at the ends of potentiometers 48 and 54, so that the bridge 30 will be balanced, and no output voltage will appear at sliders 46 and 52 when the pointers 14 and 16 are in vertical alignment with each other at any point across the width of the recorder scale 18.

With the system in operation, contact 52 moves across the slidewire 54 in an amount proportional to the movement of pointer 14 away from target indicator 16. The movement of contact 52 supplies an error voltage to controller 60. This voltage is obviously proportional to the degree of unbalance of the bridge circuit 30, which is in turn proportional to the separation between pointers 14 and 16, which separation represents the basic error signal, indicating a deviation from the desired dimension of the product. The error voltage is derived from the bridge 30 which is energized by the tachometer generator 32.

Since the generator 32 is coupled to the process speed, the voltage supplied to bridge 30 will be a continuous D.C. voltage proportional to process speed. Therefore, the voltage signal which is received by controller 60 from line 58 will be an error signal of varying sensitivity proportional to the speed of the process specifically, an error signal proportional to the product of the process deviation and the process speed.

FIG. 2 shows an embodiment of the present invention wherein a varying gain device or automatic gain amplifier is inserted in series with a constant error sensitivity signal that is obtained from an error transducer. The system shown in FIG. 2 may be used with the control system disclosed in the patent application of Richard F. Warren, Serial No. 657,434 by replacing triode 136 of the last named application with the variable gain amplifier 31 of FIG. 2 of the present application.

The operation of the system as shown in FIG. 2 is as follows. The error transducer 11 creates an A.C. signal of constant error sensitivity which passes through line 13 to control grid 15, of tube 31. The tachometer 32 is coupled to the process speed through mechanical coupling 21 and creates a varying D.C. voltage proportional to the speed of the process. This varying D.C. voltage is attenuated by the voltage dividing network of resistor 17 and potentiometer 19 and supplied to the control grid 25 of amplifier 31 over line 23. The output voltage of amplifier 31 is applied to the controller 60 through a coupling circuit comprising capacitor 27 and resistance 29, thus, supplying controller 60 with an error signal voltage having a varying sensitivity which increases as a direct function of the process speed. It is apparent that by proper selection of amplifier 31 and the operating parameters thereof, the gain of the amplifier can be made to vary as either a linear or a non-linear function of the process speed. Generally the linear gain characteristic is employed, whereby the system of FIG. 2 produces the same result as the system of FIG. 1; that is, it provides a signal input to controller 60 which is directly proportional to the product of the process error and the process speed. However, it is anticipated that in certain control applications it will be found advantageous to utilize the readily available non-linear characteristics.

While the disclosed embodiments of the invention utilize apparatus which is outwardly similar in many respects to conventional speed control servomechanisms which employ tachometer feedback for stabilization purposes, it is to be emphasized that directly opposite principles are involved. In the conventional servomechanism, the controller input is proportional to the difference between the error signal and the tachometer signal, so that an increased value of the tachometer signal always decreases the effect of a given error signal on the controller. According to this invention, the error signal is multiplied by a direct function of the tachometer signal so that an increased value of the tachometer signal always increases the effect of a given error signal on the controller.

While the invention has been described and illustrated in specific embodiments wherein it is obvious that the objects of the invention have been accomplished, it should be appreciated that changes and modifications can be made in the disclosed apparatus without departing from the essential principles of the invention. It must be clearly understood that the particular means herein shown and described are to be considered illustrative only and that restrictions to the scope of the invention are set forth in the appended claims.

What is claimed is:

1. A control system for a continuous material processing apparatus having a variable process speed comprising: means for indicating an error proportional to the deviation of said material from predetermined conditions, means for generating a voltage which varies proportionally with said process speed, means combining said indicated error and said generated voltage for producing a signal which exhibits a variable error voltage sensitivity increasing with said process speed, and means for utilizing said signal to control said processing apparatus.

2. A control system for a continuous material processing apparatus having a variable process speed comprising: means for indicating an error proportional to the deviation of said material from predetermined conditions, means for generating a voltage which varies proportionally with said process speed, means combining said indicated error and said generated voltage for producing a signal which exhibits a variable error voltage sensitivity increasing with said process speed, and means for utilizing said signal to control said processing apparatus; said voltage generating means comprising a tachometer generator mechanically coupled to the speed of the process.

3. The apparatus of claim 2 wherein said combining means comprises an electrical bridge circuit and wherein said generator supplies the voltage source of said bridge and said error indicating means controls the voltage output of said bridge relative to said source voltage.

4. The apparatus of claim 2 wherein said combining means comprises an automatic gain controlled amplifier responsive to both said generator voltage and said error indicating means.

5. The apparatus of claim 2 wherein said combining means comprising a vacuum tube and wherein said error indicating means produces a constant sensitivity error voltage signal.

6. In a control system for a material processing apparatus having a variable process speed, the combination of means for providing an error signal representing the deviation of said material from a predetermined condition, controller means energized by said signal for correctively adjusting said processing apparatus, means for generating a rate signal representing said variable process speed, and means for multiplying the effect of said error signal on said controller by an amount proportional to a direct function of the value of said rate signal.

7. In a control system for a material processing apparatus having a variable process speed, means for generating an error signal representing the deviation of said material from a predetermined condition, means for generating a rate signal representing said process speed, means for computing the product of said error signal and said rate signal, and means for utilizing said product to control said processing apparatus.

8. In a control system for a material processing apparatus having a variable process speed, means for generating an error signal representing the deviation of said material from a predetermined condition, means for generating a rate signal representing said process speed, controller means responsive to said error signal for controlling said processing apparatus, and means for increasing the response of said controller to said error signal when said rate signal increases and for decreasing said response when said rate signal decreases.

References Cited in the file of this patent

UNITED STATES PATENTS

| | | |
|---|---|---|
| 2,248,504 | Kenny | July 8, 1941 |
| 2,488,404 | Harris | Nov. 15, 1949 |
| 2,583,580 | Ludwig | Jan. 29, 1952 |
| 2,891,206 | Dillonaire | June 16, 1959 |